United States Patent [19]

Walmsley

[11] Patent Number: 5,506,278
[45] Date of Patent: Apr. 9, 1996

[54] POLYURETHANE FOAMS

[75] Inventor: Graham D. Walmsley, Hickory, N.C.

[73] Assignee: Hickory Springs Manufacturing Company, Hickory, N.C.

[21] Appl. No.: 357,345

[22] Filed: Dec. 15, 1994

Related U.S. Application Data

[63] Continuation of Ser. No. 166,750, Feb. 22, 1988, abandoned, which is a continuation of Ser. No. 766,703, Aug. 19, 1985, abandoned.

[30] Foreign Application Priority Data

Aug. 30, 1984 [GB] United Kingdom .............. 8421967

[51] Int. Cl.$^6$ .................. C08J 9/04; C08K 5/17; C08K 5/3492; C08L 75/08
[52] U.S. Cl. .............. 521/128; 521/137; 521/163; 521/170; 521/174; 521/906
[58] Field of Search ............... 521/128, 137, 521/170, 174, 163, 906

[56] References Cited

U.S. PATENT DOCUMENTS

| | | | |
|---|---|---|---|
| 3,297,597 | 1/1967 | Edwards et al. | 521/166 |
| 3,341,482 | 9/1967 | Gmitter et al. | 521/118 |
| 3,399,151 | 8/1968 | Kaiser | 521/166 |
| 3,462,381 | 8/1969 | Eaton et al. | 521/166 |
| 3,622,526 | 11/1971 | Zorn | 521/61 |
| 3,629,308 | 12/1971 | Bailey et al. | 556/445 |
| 3,681,273 | 8/1972 | Kelly | 521/177 |
| 3,726,835 | 4/1973 | Bertozzi | 528/61 |
| 3,803,063 | 4/1974 | Krentz, Jr. | 521/137 |
| 3,824,239 | 7/1974 | Narayan et al. | 521/166 |
| 3,897,372 | 7/1975 | Kehr et al. | 521/122 |
| 4,008,185 | 2/1977 | Olstowski | 521/163 |
| 4,066,578 | 1/1978 | Murch et al. | 521/123 |
| 4,098,729 | 7/1978 | Kollmeier et al. | 521/128 |
| 4,137,265 | 1/1979 | Edwards et al. | 521/167 |
| 4,139,501 | 2/1979 | Rudner et al. | 521/136 |
| 4,143,029 | 3/1979 | Matthews et al. | 521/115 |
| 4,162,276 | 7/1979 | Rim et al. | 525/2 |
| 4,197,373 | 4/1980 | Miano et al. | 521/128 |
| 4,221,875 | 9/1980 | Yukuta et al. | 521/128 |
| 4,239,856 | 12/1980 | Rowton | 521/118 |
| 4,246,146 | 1/1981 | Woods et al. | 524/14 |
| 4,258,141 | 3/1981 | Jarre et al. | 521/114 |
| 4,293,657 | 10/1981 | Nissen et al. | 521/166 |
| 4,317,889 | 3/1982 | Pcolinsky, Jr. | 521/107 |
| 4,335,029 | 6/1982 | Dabi et al. | 524/589 |
| 4,374,207 | 2/1983 | Stone et al. | 521/107 |
| 4,374,209 | 2/1983 | Rowlands | 521/116 |
| 4,381,351 | 4/1983 | Szabat | 521/107 |
| 4,385,131 | 5/1983 | Fracalossi et al. | 521/55 |
| 4,387,194 | 6/1983 | Ottaviani et al. | 525/454 |
| 4,390,642 | 6/1983 | Smith | 521/112 |
| 4,421,868 | 12/1983 | Smith | 521/112 |
| 4,421,872 | 12/1983 | Buthe et al. | 521/174 |
| 4,427,797 | 1/1984 | Smith | 521/166 |
| 4,438,028 | 3/1984 | Schmittmann | 252/609 |
| 4,451,622 | 5/1984 | DiDomenico, Jr. | 525/456 |
| 4,481,308 | 11/1984 | Gray | 521/120 |
| 4,485,195 | 11/1984 | Brennan et al. | 521/167 |
| 4,515,632 | 5/1985 | Maurer et al. | 106/18.16 |
| 4,579,876 | 4/1986 | Ilipulos | 521/136 |
| 4,745,133 | 5/1988 | Grinbergs et al. | 521/129 |
| 4,849,459 | 7/1989 | Grace et al. | 521/110 |
| 5,057,545 | 10/1991 | Muhl et al. | 521/103 |
| 5,086,082 | 2/1992 | Stone | 521/107 |
| 5,087,384 | 2/1992 | Horacek et al. | 521/128 |
| 5,093,378 | 3/1992 | Ishiwaka et al. | 521/128 |
| 5,104,905 | 4/1992 | Haas et al. | 521/128 |
| 5,104,906 | 4/1992 | Haas et al. | 521/108 |
| 5,106,883 | 4/1992 | Horacek | 521/105 |
| 5,118,721 | 6/1992 | Godoy et al. | 521/103 |
| 5,198,473 | 3/1993 | Gallagher et al. | 521/99 |
| 5,250,581 | 10/1993 | Gastinger et al. | 521/137 |

FOREIGN PATENT DOCUMENTS

| | | |
|---|---|---|
| 0004618 | 10/1979 | European Pat. Off. . |
| 0023987 | 2/1981 | European Pat. Off. . |
| 0051347 | 5/1982 | European Pat. Off. . |
| 0056267 | 7/1982 | European Pat. Off. . |
| 0079115 | 5/1983 | European Pat. Off. . |
| 2043917 | 3/1972 | Germany . |
| 2348838 | 4/1975 | Germany . |
| 2809084 | 9/1978 | Germany . |
| 1030162 | 5/1966 | United Kingdom . |
| 1029963 | 5/1966 | United Kingdom . |
| 1359014 | 8/1974 | United Kingdom . |
| 1462292 | 1/1977 | United Kingdom . |
| 1477333 | 6/1977 | United Kingdom . |
| 1501172 | 2/1978 | United Kingdom . |
| 1509066 | 4/1978 | United Kingdom . |
| 1546705 | 5/1979 | United Kingdom . |
| 1585750 | 3/1981 | United Kingdom . |
| 2072204 | 9/1981 | United Kingdom . |
| 2094315 | 9/1982 | United Kingdom . |
| 2098229 | 11/1982 | United Kingdom . |
| 2102822 | 2/1983 | United Kingdom . |
| 2102825 | 2/1983 | United Kingdom . |
| 2102824 | 2/1983 | United Kingdom . |
| 2124634 | 2/1984 | United Kingdom . |
| 2177406 | 1/1987 | United Kingdom . |
| 2177405 | 1/1987 | United Kingdom . |

OTHER PUBLICATIONS

"Foams Show Improvement Over Time," Journal of Commerce. Wednesday, Mar. 27, 1985.
Solodovnik et al., Effects of fillers on physico–mechanicalproperties and flammability of polyurethan foam (1983).
"Flame Retardancy Gain Seen," Chemical Marketing Report, Apr. 1, 1985, p. 3.
Chemical Abstracts, 85, 144070a (1976).
Chemical Abstracts, 99, 23618r (1983).

(List continued on next page.)

Primary Examiner—James J. Seidleck
Assistant Examiner—Rabon Sergent
Attorney, Agent, or Firm—Fisher, Christen & Sabol

[57] ABSTRACT

A flexible polyurethane foam is made by reacting an isocyanate with a polyol in the presence of a foam-forming agent and a fire-retardant additive. The fire-retardant additive comprises melamine and this is used in conjunction with a polyol which is of the polymer-modified polyol kind, i.e. a polyol containing a polymeric substance such as a dispersed alkanolamine/isocyanate polyaddition product.

30 Claims, No Drawings

OTHER PUBLICATIONS

Chemical Abstracts, 101, 56593s (1984).
Chemical Abstracts, 101, 56594t (1984).
Osawa et al. Effect of Various Additives on the Photodegradation of Polyurethanes (1984).
Chemical Abstracts, 69, 3611k (1968).
Chemical Abstracts, 73, 26206d (1970).
Chemical Abstracts, 85, 125105z (1976).
"Melamine," BASF Technical Leaflet (Apr. 1970) pp. 8–13, No. M5012e.
Oertel, Gunter, *Polyurethane Handbook*, Hanser Pub., Munich, pp. 102, 103, 115, 181, 182, 191, 223 (1985).
Buist, J. M., *Developments in Polyurethane–I*, Applied Science Pub. Ltd., London, pp. 175–178 and 187 (1978).
Woods, *Flexible Polyurethane Foams Chemistry and Technology*, Applied Science Publishers, London, pp. 84–92, 122–124, 134, 139 (1982).
"Flame Retardancey Gain Seen," *Chemical Marketing Report*, p. 3, (Apr. 1985).
"Foams Show Improvement Over Time," *Journal of Commerce*, (Mar. 27, 1985).
"Fire–Retardant Flexible Uretane Foams Debut," C & E News, Apr. 1, 1985, p. 18.
"A New Foam For Furniture," Chemical Week, Apr. 3, 1985, p. 10.
BASF Press Release, Pluracol Polycol C–133, Mar. 25, 1985.
BASF Technical Bulletin, Pluracol Polyol C–133, Mar. 1985.
Genz et al., "Flame–Resistant Flexible Foams", PRI–Urethane Group International Symposium, Oct. 14, 1987.
Hogan et al., "Humidity Characteristics of HR and Hot Urethane Foams", Journal of Cellular Plastics, Sep./Oct. 1973, pp. 219–220.
Patten et al., "Polymer–Polyols in the Development of High Resiliency Foams", Journal of Cellular Plastics, Nov./Dec. 1974, pp. 276–277, 282.
Patten et al., "Highly Resilient, Cold Molded Urethane Flexible Foam" Journal of Cellular Plastics, May/Jun. 1972, pp. 134–136.
Kollmeier et al., "New Crossliners in the Development of High Resilience Polyurethane Foams", The Society of the Plastics Industry (1976) pp. 82–87.
Kleiner et al., "Recent Advances in High Resilience (HR) Foam Technologies", Journal of Cellular Plastics, Jan.–Feb. 1984, pp. 49–50.
"A Comparison Between Highly Resilient and Conventional Slabstock Foam" Union Carbide Technical Bulletin Chemicals and Plastics (ca. 1980).

POLYURETHANE FOAMS

This application is a continuation of prior U.S. application Ser. No. 07/166,750 filing date Feb. 22, 1988, now abandoned, which is a continuation of application Ser. No. 06/766,703 filing date Aug. 19, 1985, now abandoned.

This invention relates to flexible polyurethane foams having fire-retardant properties made by reacting a polyol with a polyisocyanate in the presence of a foam-forming agent and a fire-retardant additive.

Flexible polyurethane foams are widely used as resilient structural materials, particularly as cushioning or padding materials in furniture, and it is known to incorporate fire-retardant additives in such foams. However, it has been found difficult to achieve adequate fire retardancy economically, without unduly adversely affecting important physical properties such as resilience, and without giving problems of smoke or noxious gas emission (as is the case with conventional halogenated fire retardants).

U.S. Pat. No. 4,385,131 describes the use of urea and also melamine as polyurethane fire retardants. These substances can be effective and economic and also can avoid problems with regard to smoke and noxious gas emission. However, the urea/melamine is incorporated together with an adhesive used to bond together particles of pre-formed foam, rather than in the foam itself, whereby the problem of impairment of physical properties of the foam is avoided.

U.S. Pat. No. 4,258,141 refers to the incorporation of melamine in a flexible polyurethane foam but the described process requires the use of a special isocyanate for reaction with the polyol.

U.K. Patent 1,585,750 describes the incorporation of melamine in a polyurethane foam formed from conventional polyol and isocyanate starting materials, but only in the context of rigid foams.

An object of the present invention is to provide a flexible polyurethane foam which incorporates an effective, acceptable fire-retardant additive, which has satisfactory physical properties, and which can be manufactured easily and inexpensively.

According to the invention therefore there is provided a method of providing a flexible polyurethane foam wherein an isocyanate is reacted with a polyol in the presence of a foam-forming agent and a fire-retardant additive, characterised in that the fire-retardant additive is melamine and the polyol is a polymer-modified polyol.

According to the invention there is also provided a method of producing a fire-retardant, high-resilience flexible polyurethane foam, comprising reacting an isocyanate and a polymer-modified polyol together in the presence of a foam-forming agent and melamine to produce a high-resilience foam, the melamine being present in a proportion sufficient to impart effective fire-retardancy properties to the high-resilience flexible foam and being the only fire-retardant additive in the high-resilience flexible foam.

With this process it has been found that excellent fire retardancy can be achieved due to the action of the melamine, yet it is also possible to achieve excellent physical properties, this being a consequence of the use of the polymer-modified polyol with the melamine.

Moreover the ingredients of the process can be relatively inexpensive and in fire conditions there are less problems with regard to smoke or noxious gas emission.

The present invention is based on the realisation that fire retardancy due to melamine is dramatically promoted by the use of formulations based on polymer-modified polyols, compared with formulations based on non-modified polyols. In this respect it is to be understood that the physical properties of a flexible foam are dependent on the nature and relative proportions of the various foam-forming ingredients. In particular, it is customary to include a foam stabilizing surfactant, especially a polysiloxane-polyalkylene oxide block copolymer in which the oxyalkylene and siloxane moieties are linked through direct carbon to silicon or carbon to oxygen to silicon bonds. Surfactants of this kind act as foam stabilizers in that they assist formation of the necessary open foam cells and they help prevent collapse of the foam until the product has developed sufficient gel strength to become self-supporting. Reference is made to U.S. Pat. No. 3,629,308 which contains a more detailed description of polysiloxane-polyalkylene oxide block copolymer surfactants. The foam stabilizing properties of these surfactants depend on their molecular structure and particularly their molecular weights in relation to the kind of polyol used. As mentioned in U.S. Pat. No. 3,629,308 the molecular weight may be in the range 3000 to 12000. Thus, where polyurethane foam is produced from polyols of relatively low activity, e.g. polyols of low primary hydroxyl content or which have a large preponderance of secondary hydroxyl groups or which have low activity as a consequence of propylene oxide end capping, it is customary to use a relatively high molecular weight surfactant typified by that sold by Union Carbide under the designation L-6202. On the other hand, when using high activity polyols, satisfactory flexible foams can be achieved with relatively low molecular weight surfactants (i.e. nearer to the lower end than the higher end of the molecular weight range) typified by that sold by Dow Corning under the designation Silicone 5043. In the case of a polymer-modified polyol, a satisfactory flexible foam, particularly a flexible foam of the kind known as a high resilience foam which is of special usefulness in furniture, is customarily obtained using a formulation based on a relatively high activity polyol and a relatively low molecular weight polysiloxane-polyalkylene oxide block copolymer surfactant. As stated, in accordance with the present invention, it has been found, unexpectedly, that such polymer-modified polyol-based formulations dramatically promote fire retardancy of melamine-containing foams, possibly as a consequence of the intrinsic flammability characteristics of the polymer-modified polyol particularly when accompanied by the low molecular weight surfactant, whereby high levels of fire retardancy can be achieved with a relatively low level of melamine. Such low levels are specially advantageous because unacceptable impairment of physical properties of the foam, particularly its resilience, such as is to be expected with a high melamine level, can be avoided. With polyurethane foam based on conventional non-modified polyols, a relatively high level of melamine would be required for acceptable fire retardancy and this would tend to adversely affect foam physical properties and to require an increase in foam density to enable suitable polymer to filler ratios to be obtained thereby adversely affecting the economics of the foam produced.

It has also been found that the presence of melamine is beneficial in the context of a flexible foam in so far as it assists in opening the cells.

By polymer-modified polyol is meant a polyol carrier containing additional polymeric material which can act as a polymeric filler influencing cell structure in the finished polyurethane foam. The polymeric material may be a physical dispersion or solution in the polyol and/or may be chemically combined therewith. Preferably it is a dispersion. Suitable polymer-modified polyols are described in U.K. Patent 1,501,172 and U.S. Pat. No. 4,374,209. Thus, the polymer-modified polyol may be either a dispersion of a polyurea and/or polyhydrazodicarbonamide in a relatively high M.Wt. organic compound containing at least two hydroxyl groups or a dispersion of the polyaddition products resulting from reacting an alkanolamine with an organic polyisocyanate in the presence of a polyol containing at least two hydroxyl groups. In either case, the percentage of polyurea/polyhydrazodicarbonamide or polyaddition products in the polymer-modified polyol preferably constitutes 1% to 35% by weight based on the polyol.

Another kind of polymer-modified polyol which is described in U.S. Pat. No. 4,374,209 and U.K. Patent Nos. 1,482,213 and 1,501,172 which may be used is a polyol having dispersed therein and/or chemically combined therewith a polymeric material derived from the in-situ polymerization of an ethylenically unsaturated monomer such as a grafted polyether obtained by polymerization of acrylonitrile and styrene in a polyether polyol.

The polyol carrier may be any suitable substance including polyether polyols having a molecular weight in the range 200 to 10,000 such as are known for use in the polyurethane-forming reaction and described for example in U.K. Patent 1,482,213 and as referred to in the above-mentioned U.K. Patent 1,501,172 and U.S. Pat. No. 4,374,209. Such known polyether polyols can be obtained by reaction of alkylene oxides with active hydrogen containing compounds, the molecular weight of the reaction product depending on the amount of alkylene oxide reacted. Typically, the polyether polyol may have a hydroxyl number in the range 20 to 80 and from two to four hydroxyl groups per molecule. Most preferably the polyol has a high primary hydroxyl content, particularly at least 50% primary hydroxyl. Suitable polyols are readily commercially available, for example Dow Chemicals Voranol 4301.

As described in U.S. Pat. No. 4,374,209 a suitable polymer-modified polyol can be obtained by reacting an alkanolamine, particularly triethanolamine, with an organic polyisocyanate in the presence of the aforesaid carrier polyol so that at the alkanolamine reacts at least predominantly polyfunctionally with the isocyanate and the polyol acts at least predominantly as an unreacted carrier. The molar ratio of the alkanolamine to the isocyanate may be in the range 1.0/0.5 to 1.0/1.6, particularly 1/0.8 to 1/1.1, although ratios in excess of 1/1.6 may also be possible particularly in the presence of a chain capping agent.

It is also possible to use a polymer-modified polyol of the kind described in U.K. Patent 1,501,172 which can be obtained by reacting isocyanate with polyamines containing primary and/or secondary amino groups and/or hydrazines and/or hydrazides in the presence of a polyether polyol having predominantly primary hydroxyl groups. A polymer-modified polyol of this kind is commercially available as Multranol 9225 (Mobay Chemical Corporation).

Any suitable organic polyisocyanate may be used in the production of the polymer-modified polyol as described in the abovementioned U.S. Pat. Nos. 1,501,172 and 4,374,209. Similarly any suitable organic polyisocyanate, as described for example in U.S. Pat. Nos. 1,501,172 and 4,374,209 or U.K. Patent 1,453,258, may be used in the polyurethane-forming reaction of the present invention. The substance known as TDI (which is a mixture of the isomers 2,4 and 2,6 toluene diisocyanate) is preferred, although it is also possible to use the substance known as MDI (polymethylene polyphenyl isocyanate) of the type obtained by condensing aniline with formaldehyde followed by phosgenation). MDI adducts and derivatives can also be used.

The foam-forming agent may comprise water which reacts with the isocyanate. Suitably there may be 1.6 to 4.6 parts by weight of water relative to 100 parts polymer-modified polyol. It is also possible to incorporate an organic blowing agent, in a proportion of 0 to 20 parts by weight, such as a halogenated hydrocarbon having a boiling point less than 100° C. at atmospheric pressure (preferably less than 50° C.) for example trichlorofluoromethane or dichlorodifluoromethane or methylene chloride.

Additives such as are conventionally used in the production of polyurethane foam may also be incorporated as appropriate including, for example, catalysts, such as tertiary amines (e.g. triethylenediamine) and organic tin compounds (e.g. stannous octoate and dibutyl tin dilaurate), cross-linking or chain lengthening agents (e.g. diethanolamine, triethanolamine, ethylene glycol and other commonly used agents), fillers, foam stabilizers, surface active agents and the like.

Most preferably, as discussed in detail above, the formulation includes a foam stabilizing surfactant which is a polysiloxane-polyalkylene oxide block copolymer (e.g. a water-soluble polydimethyl siloxane polyalkylene oxide copolymer as described in U.S. Pat. No. 3,629,308) which is of the low molecular weight kind as is conventionally used in the production of high resilience flexible foams from high activity polyol starting materials, as is typified by Dow Corning Silicone 5043. The surfactant may be incorporated in any suitable proportion, say 0.5 to 3 parts by weight (per 100 parts polyol).

The proportion of melamine used in the present invention may be in the range 15 to 150 parts by weight (per 100 parts polymer-modified polyol) or even as low as 1 part by weight. A preferred range is 50 to 150 parts by weight although the proportion of melamine depends on the particular requirements for fire retardancy and in some circumstances a proportion of melamine outside this preferred range may be acceptable.

The process of the invention may be carried out in any suitable manner and using any suitable mixing and moulding equipment. The ingredients may all be mixed together at the same time or, if desired, some ingredients may be pre-blended.

The invention is particularly suited, although not necessarily restricted, to the production of high resilience flexible foams for use for example in furniture.

The invention will now be described further with reference to the following Examples 1 to 17. Examples 2, 3, 4–6 and 9–17 are in accordance with the invention. Examples 1, 7, 8 and 14 are comparative examples not in accordance with the invention.

EXAMPLE 1

The following ingredients were used:

| | | |
|---|---|---|
| a) Polyol | 100.00 | parts by weight |
| b) Melamine | 100.00 | parts by weight |
| —) Water | 3.00 | parts by weight |
| c) Dabco 33LV | 0.15 | parts by weight |
| d) Silicone L6202 | 0.75 | parts by weight |
| e) Stannous Octoate | 0.10 | parts by weight |
| f) TDI | 41.60 | parts by weight | a) 3000 M.Wt. polyol of propylene oxide and ethylene oxide.
c) A 33% solution of triethylene diamine in dipropylene glycol.
d) Union Carbide, a high molecular weight polysiloxane-polyalkylene oxide copoylmer.
f) 80% 20%/2:4 2:6 toluene diisocyanate.

The ingredients were mixed together in a high pressure mixing head at an output of 150 lbs/minute (68 kg/min) to give a block of foam 30" wide×36" long×12" high (76 cm×91 cm×30 cm). The following day the foam was tested and gave the following results.

| | |
|---|---|
| Density | 2.43 pcf (39 kg/m³) |
| ILD 25% Deflection | 56.6 lbs. (25.7 kg) |
| Tensile Strength | 11.3 psi (78 Pa) |
| Tear Strength | 1.2 lbs/in. (0.21 kg/cm) |
| Resilience | 38% |
| Oxygen Index | 21.70% |
| Compression Set 90% Deflection | 17.5% |

EXAMPLE 2

A polymer-modified polyol was made (as esentially described in U.S. Pat. No. 4,374,209) as follows. 180 lbs. (81.6 kg) of a glycerine-started polyether of propylene oxide tipped with 9% ethylene oxide to a hydroxyl number 56 and a primary hydroxyl number of approximately 50% (e.g. Dow Chemicals Voranol 4301), was vigorously agitated, and to it was added 9.74 lbs. (4.4 kg) of triethanolamine—followed five seconds later by 10.24 lbs (4.6 kg) of TDI (80% 2:4 and 20% 2:6)—followed (five seconds later) by 0.06 lbs. (0.027 kg) of dibutyl tin dilaurate. All the chemicals were at a temperature of 20°–22° C. A rapid reaction took place and the temperature of the chemicals rose to approximately 40° C. A white, stable dispersion resulted, known as a polymer-modified polyol. This polymer-modified polyol was made into polyurethane foam by mixing with other ingredients as follow

| | |
|---|---|
| Polymer-modified polyol | 100.00 p.b.wt. |
| Melamine | 100.00 p.b.wt. |
| Water | 2.00 p.b.wt. |
| a) Dabco TL | 0.50 p.b.wt. |
| b) Diethanolamine L.F. | 0.75 p.b.wt. |
| c) Ortegol 204 | 1.00 p.b.wt. |
| —) Methylene Chloride | 5.00 p.b.wt. |
| d) Silicone 5043 | 1.10 p.b.wt. |
| —) Dibutyl tin dilaurate | 0.05 p.b.wt. |
| e) TDI | 41.38 p.b.wt. |
| f) Thermolin 101 | 2.00 p.b.wt. | a) Amine catalyst, Air Products and Chemicals Inc.
b) 85% diethanolamine, 15% water
c) Goldschmidt Chemicals
d) Silicone 5043 - Dow Corning Low molecular weight polysiloxane-polyalkylene oxide copolymer
e) 80% 2:4/20% 2:6 toluene diisocyanate
f) Tetrakis (2-chlorethyl)-ethylenediphosphate These ingredients were metered into a high pressure mixing head at a total output of 150 lbs/min (68 kg/min). Foaming took place to give block of foam 30" wide×36" long×10" high (76 cm×91 cm×25.4 cm). The following day the foam was tested and gave the following results

| | |
|---|---|
| Density | 2.88 pcf (46 kg/m³) |
| ILD 25% deflection | 26.8 lbs (12.2 kg) |
| Tensile strength | 7.3 psi (50.4 Pa) |
| Tear strength | 1.05 lbs/in (.19 kg/cm) |
| Resilience | 45% |
| Oxygen Index | 31.0% |
| Compression set 90% deflection | 11.0% |

The most noticeable difference between Examples 1 and 2 was the appreciably higher oxygen index value (a test that measures the percentage of oxygen necessary to support combustion) in Example 2. Also, the melamine in Example 1 gave 25% ILD above the level normally acceptable in furniture cushions. Any attempt to improve the oxygen index by increasing the melamine loading would cause the ILD to suffer a further increase and other physical properties to suffer accordingly.

EXAMPLE 3

The procedure of Example 2 was repeated except that the polymer-modified polyol was replaced by Multranol 9225—a polymer-modified polyol produced and sold by "Mobay" Chemical Corporation, Pittsburgh, Pa., and described in U.K. Patent 1,501,172. A foam block was produced as previously described, and also gave an oxygen index value of 30–31%.

The following further Examples demonstrate that the flammability of foams is not solely a function of the quantity of melamine used but also depends on the polyol and surfactant type used in the formulation.

| Formulation | EXAMPLES | | | | | | | | | | |
|---|---|---|---|---|---|---|---|---|---|---|---|
| | 4 | 5 | 6 | 7 | 8 | 9 | 10 | 11 | 12 | 13 | 14 |
| P.I. | 100.0 | 100.0 | 100.0 | — | — | — | — | — | — | — | — |
| E.I. | — | — | — | 100.0 | 100.0 | — | — | — | — | — | 100.0 |
| D.I. | — | — | — | — | — | 100.0 | 100.0 | 100.0 | — | — | — |
| M.I. | — | — | — | — | — | — | — | — | 100.0 | 100.0 | — |
| a) TDI Index | 105.0 | 105.0 | 105.0 | 105.0 | 105.0 | 105.0 | 105.0 | 105.0 | 105.0 | 105.0 | 105.0 |
| Water | 3.0 | 3.0 | 3.0 | 3.0 | 3.0 | 3.0 | 3.0 | 3.0 | 3.0 | 3.0 | 3.0 |
| b) DEOA LF | 1.0 | 1.0 | 1.0 | — | — | 1.0 | 1.0 | 1.0 | 1.0 | 1.0 | 1.0 |
| c) DC-5043 | 2.0 | 2.0 | 2.0 | — | — | 2.0 | 2.0 | 2.0 | 2.0 | 2.0 | 2.0 |
| d) L-6202 | — | — | — | 0.75 | 0.75 | — | — | — | — | — | — |
| e) 33-LV | 0.15 | 0.15 | 0.15 | 0.15 | 0.15 | 0.15 | 0.15 | 0.15 | 0.15 | 0.15 | 0.15 |
| f) T-12 | 0.10 | 0.10 | 0.10 | — | — | 0.10 | 0.10 | 0.10 | 0.10 | 0.10 | 0.10 |
| g) T-9 | — | — | — | 0.165 | 0.165 | — | — | — | — | — | — |
| Melamine | 50.0 | 100.0 | 150.0 | 100.0 | 150.0 | 50.0 | 100.0 | 150.0 | 50.0 | 100.0 | 100.0 |
| h) Thermolan 101 | 2.0 | 2.0 | 2.0 | 2.0 | 2.0 | 2.0 | 2.0 | 2.0 | 2.0 | 2.0 | 2.0 |
| Oxygen Index | 27.0 | 31.0 | 32.0 | 25.0 | 27.0 | 25.0 | 28.0 | 30.0 | 25.0 | 28.0 | — |

P.I. Polyol was a polymer-modified polyol as described in Example 2.
E.I. Polyol was a 3000 M.Wt. polyol containing approximately 8% to 10% ethylene oxide with a propylene oxide end cap (i.e. not a polymer-modified polyol), typically Shell MD 1070.

-continued

| | EXAMPLES | | | | | | | | | | |
|---|---|---|---|---|---|---|---|---|---|---|---|
| Formulation | 4 | 5 | 6 | 7 | 8 | 9 | 10 | 11 | 12 | 13 | 14 |

D.I. Polyol was a polymer-modified polyol as described in Example 3.
M.I. Polyol was a polymer-modified polyol as described in Example 2 except that the 10.24 lbs (4.6 kg) of TDI was replaced with 16.24 lbs (7.4 kg) of MDI (polymethylene polyphenyl isocyanate).
a) TDI index is determined by the equivalent ratio of diisocyanate groups to hydroxyl groups. In this case, the quantity of TDI necessary to give a ratio of 1.05 was used.
b) 85% diethanolamine, 15% water.
c) Dow Corning Silicone 5043 foam stabilising surfactant.
d) Union Carbide L6202 foam stabilizing surfactant.
e) Dabco 33 LV - 33% solution of triethylene diamine in dipropylene glycol.
f) Dibutyl tin dilaurate.
g) Stannous octoate.
h) Tetrakis (2-chlorooethyl)-ethylenediphosphate.

Foams were produced from all the above formulations with the exception of Example 14 where the polyol was of insufficient activity to be formulated with the surfactant type 5043. The foam collapsed as a consequence of the use of the "wrong" surfactant for the polyol thereby demonstrating the importance of using a polymer-modified polyol to give a foam which is both fire retardant and physically acceptable. Comparing the oxygen index values of the foam produced it will be seen that Example 4 with 50 parts melamine had the same oxygen index as Example 8 containing three times as much melamine.

The ILD (load required to deflect the foam 25%) was 30 lbs (13.6 kg) in the case of Example 4, but 58 lbs (26 kg) in the case of Example 8.

The higher amount of melamine required to match the oxygen index resulted in an unacceptably high ILD, and a density increase of from 2.55 lbs/cu.ft. (40.8kg/m$^3$) to 4.42 lbs/cu.ft. (70.7 kg.m$^3$).

EXAMPLE 15

A softer grade of foam than Example 4 but at the same time density was made from the following formulations.

| | |
|---|---|
| P.I. | 100.00 |
| TDI | 105 index |
| Water | 2.40 |
| Methylene chloride | 7.50 |
| DEOA LF | 1.00 |
| 33 LV | 0.35 |
| T-12 | 0.20 |
| Thermolin 101 | 2.00 |
| DC-5043 | 2.00 |
| Melamine | 100.00 |

The ILD was 23.0 (compared to 30.00) but the oxygen index was the same at 31.0.

EXAMPLE 16

Example 15 was repeated but replacing the TDI with MDI (polymethylene, polyphenyl isocyanate) i.e. using the following formulations.

| | |
|---|---|
| P.I. | 100.00 |
| MDI | 105 index |
| Water | 2.40 |
| Methylene chloride | 7.50 |
| DEOA LF | 1.00 |
| 33 LV | 0.35 |
| T-12 | 0.20 |
| Thermolin 101 | 2.00 |
| DC-5043 | 2.00 |
| Melamine | 100.00 |

Because of the higher functionality of the MDI compared to TDI, the ILD and density of the foam increased, but the oxygen index remained the same at 31.0.

These results showed that the flame retardancy—as measured by oxygen index was constant for a specific density and a constant polymer-modified polyol/melamine ratio despite formulation changes to alter ILD. Also, a change in the type of isocyanate used did not change the oxygen index for a given formulation.

EXAMPLE 17

A production quantity of foam was produced with the following formulation.

| | |
|---|---|
| P.I. | 100.00 |
| Melamine | 100.00 |
| Fyrol Cef* | 5.00 |
| TDI | 105 index |
| Water | 2.00 |
| 33 LV | 0.22 |
| DEOA LF | 0.80 |
| T-12 | 0.110 |
| DC-5043 | 1.80 |
| Methylene chloride | 9.00 |

*TRI (β-chlorethyl) phosphate.

Blocks of foam 72" wide×28" high (183 cm×71 cm) were produced. On testing the following results were obtained:

| | |
|---|---|
| Density | 3.55 lbs/cu.ft. (56.8 kg/m$^3$) |
| ILD | 33.0 lbs (15 kg) |
| Rebound resilience | 51% |
| Compression Set 90% Deflection | <12% |
| Oxygen index | 32.0 |
| California Technical Bulletin 117, Open Flame | Pass |
| Smouldering - % weight retained | 99.2% |
| Radiant panel test (ASTM E-602) | <25.0 |
| Flame spread index per South West Research Institute 1" thick | |
| California Technical Bulletin 133 (draft specification) | |
| Uncovered | Pass |
| Covered | pass |
| Boston Fire Department Chair Test | |
| Uncovered | Pass |
| Covered | Pass |
| UL 94 HF (Underwriter laboratory test) | Pass |

-continued

| | |
|---|---|
| MVSS 302 (Motor Vehicle Safety Standard test) NY/NJ Port Authority | Pass |
| a) 25.853 b (FAA) | Pass |
| b) ASTM E-162 | Pass |
| California Technical Bulletin 121 | Pass |

The California Technical Bulletin tests mentioned above relate to tests set by the Bureau of Home Furnishing, State of California, U.S.A. The foam of the Example submitted to these tests easily met the required standards and some or all of the test standards could have been met with lower levels of melamine. Thus, it is to be understood that the levels of melamine given in the various Examples are only intended to be illustrations. In fact different levels within the above stated range (1% to 150%) are possible depending in particular on the test standard which is to be met. With less demanding standards the flame retardancy which is achieved with extremely low levels of melamine may be acceptable. With extremely demanding standards high levels of melamine may be necessary.

Foams according to the Examples of the invention can be typically made at densities ranging from 2.0–8.0 pcf (32–128 kg/m$^3$).

It is of course to be understood that the invention is not intended to be restricted to the above Examples.

I claim:

1. A method of producing a fire-retardant, high resilience flexible polyurethane foam, comprising reacting an isocyanate and a polymer-modified polyol together in the presence of a foam-forming agent and melamine to produce a high-resilience flexible foam, the melamine being present in a proportion sufficient to impart effective fire-retardancy properties to the high-resilience flexible foam and being the only fire-retardant additive in the high-resilience flexible foam.

2. A method according to claim 1, wherein at least 50% of the hydroxyl groups of the polyol are primary hydroxyl groups.

3. A method according to claim 2, wherein the polymer-modified polyol comprises a dispersion of a polymeric substance in a carrier polyol, the carrier polyol being at least predominantly unreacted with the polymeric substance.

4. A method according to claim 3, wherein the polymeric substance is a polyaddition product of an alkanolamine and an isocyanate.

5. A method according to claim 4, wherein the alkanolamine is triethanolamine.

6. A method according to claim 3, wherein the polymeric substance is a reaction product of an isocyanate with at least one member selected from the group consisting of polyamines, hydrazines and hydrazides.

7. A method according to claim 3, wherein the amount of polymeric substance is 1% to 35% by weight of the polymer-modified polyol.

8. A method according to claim 1, wherein melamine is present in an amount of 1% to 150% by weight of the polymer-modified polyol.

9. A method according to claim 8, wherein the amount of melamine is 50% to 150% by weight of the polymer-modified polyol.

10. A method according to claim 1, further comprising the incorporation of a foam stabilizing surfactant which is a low molecular weight polysiloxane-polyalkylene oxide block copolymer.

11. A method according to claim 1 wherein the polymer-modified polyol comprises a polyol having dispersed therein and/or chemically combined therewith a polymeric material derived from the in-situ polymerization of an ethylenically unsaturated monomer.

12. A method according to claim 11 wherein the polymer-modified polyol comprises a grated polyether obtained by polymerization of acrylonitrile and styrene in a polyether polyol.

13. A fire-retardant, high-resilience flexible polyurethane foam made by the method of claim 1.

14. A method of producing a fire-retardant, high-resilience flexible polyurethane foam, comprising reacting an isocyanate and a polymer-modified polyol together in the presence of a foam-forming agent and melamine to produce a high-resilience flexible foam, the melamine being present in a proportion sufficient to impart effective fire-retardancy properties to the high-resilience flexible foam and being the only fire-retardant additive in the high-resilience flexible foam, and the polymer-modified polyol comprising a dispersion of a polymeric substance in a carrier polyol, the polymeric substance being a member selected from the group consisting of polyaddition products of an alkanolamine and an isocyanate and reaction products of an isocyanate with at least one member selected from the group consisting of polyamines, hydrazines and hydrazides.

15. A method according to claim 14 wherein at least 50% of the hydroxyl groups of the carrier polyol are primary hydroxyl groups.

16. A method according to claim 15 wherein the carrier polyol is at least predemoninantly unreacted with the polymeric substance.

17. A method according to claim 16, wherein the polymeric substance is a polyaddition product of an alkanolamine and an isoycanate.

18. A method according to claim 17, wherein the alkanolamine is triethanolamine.

19. A method according to claim 16, wherein the polymeric substance is a reaction product of an isocyanate with at least one member selected from the group consisting of polyamines, hydrazines and hydrazides.

20. A method according to claim 16, wherein the amount of polymeric substance is 1% to 35% by weight of the polymer-modified polyol.

21. A method according to claim 14, wherein melamine is present in an amount of 1% to 150% by weight of the polymer-modified polyol.

22. A method according to claim 21, wherein the melamine is 50% to 150% by weight of the polymer-modified polyol.

23. A method according to claim 14, further comprising the incorporation of a foam stabilizing surfactant which is a low molecular weight polysiloxane-polyalkylene oxide block copolymer.

24. A fire-retardant, high-resilience flexible polyurethane foam made by the method of claim 14.

25. A method for the preparation of a flame-retardant flexible polyurethane foam comprising reacting a polymer-modified polyol, an organic polyisocyanate, a blowing agent, and a silicon surfactant, wherein mixed with the polymer-modified polyol is melamine in amount ranging from about 1 to about 150 percent by weight of the polymer-modified polyol as the sole flame retardant compound.

26. A method for the preparation of a flame-retardant flexible polyurethane foam consisting of reacting a polyoxyalkylene polyether polyol having a molecular weight in the range of from 200 to 10,000, said polyether polyol being a polymer modified polyol, an organic polyisocyanate, a blowing agent, and a silicon surfactant, wherein mixed with the polyether polyol is melamine in an amount ranging from about 1 to about 150% by weight of the polyol as the sole flame retardant compound.

27. A method according to claim 26 wherein the polymer modified polyol comprises a dispersion of a polymeric substance in a carrier polyol, the polymeric substance being a polyaddition product of an alkanolamine and an isocyanate.

28. A method according to claim 26 wherein the polymer modified polyol comprises a dispersion of a polymeric substance in a carrier polyol, the polymeric substance being a reaction product of an isocyanate with at least one member selected from the group consisting of polyamines, hydrazines and hydrazides.

29. A method according to claim 26 wherein the polymer-modified polyol comprises a polyol having dispersed therein and/or chemically combined therewith a polymeric material derived from the in-situ polymerization of an ethylenically unsaturated monomer.

30. A method according to claim 29 wherein the polymer-modified polyol comprises a grafted polyether obtained by polymerization of acrylonitrile and styrene in a polyether polyol.

* * * * *